(12) United States Patent
Betzalel

(10) Patent No.: US 10,814,792 B2
(45) Date of Patent: Oct. 27, 2020

(54) CARDBOARD ROOF RACK SYSTEM

(71) Applicant: EASY CARRY LTD, Jerusalem (IL)

(72) Inventor: Sasson Betzalel, Jerusalem (IL)

(73) Assignee: EASY CARRY LTD, Jerusalem (IL)

( * ) Notice: Subject to any disclaimer, the term of this patent is extended or adjusted under 35 U.S.C. 154(b) by 263 days.

(21) Appl. No.: 15/402,593

(22) Filed: Jan. 10, 2017

(65) Prior Publication Data
US 2017/0113623 A1 Apr. 27, 2017

Related U.S. Application Data

(63) Continuation-in-part of application No. PCT/IL2015/050776, filed on Jul. 28, 2015.

(30) Foreign Application Priority Data

Jul. 29, 2014 (IL) .......................................... 233856

(51) Int. Cl.
*B60R 9/00* (2006.01)
*B60R 9/04* (2006.01)
*B60R 9/058* (2006.01)
*B60R 9/052* (2006.01)
*B62D 65/16* (2006.01)

(52) U.S. Cl.
CPC ................ *B60R 9/04* (2013.01); *B60R 9/052* (2013.01); *B60R 9/058* (2013.01); *B62D 65/16* (2013.01)

(58) Field of Classification Search
CPC .......... B60R 9/04; B60R 9/052; B60R 9/058; B62D 65/16

USPC ........................................................ 224/329
See application file for complete search history.

(56) References Cited

U.S. PATENT DOCUMENTS

| | | | | |
|---|---|---|---|---|
| 2,886,271 A * | 5/1959 | Williamson | ............ | B60R 9/045 224/309 |
| 3,165,353 A * | 1/1965 | Weise | ....................... | B60R 9/04 296/210 |
| 3,606,230 A * | 9/1971 | Hargreaves | ............. | B60R 9/052 248/346.01 |
| 5,339,746 A * | 8/1994 | Vannatta | ............ | B65D 19/0012 108/51.3 |
| 6,769,728 B2 * | 8/2004 | Albaisa | ..................... | B60R 9/04 224/309 |
| 7,422,130 B2 * | 9/2008 | Shaukat | .................. | B60R 9/045 224/309 |
| 8,534,516 B1 * | 9/2013 | Vo | ........................... | B60R 9/052 224/318 |
| 8,978,946 B2 * | 3/2015 | Gerhardt | ................. | B60R 9/052 224/321 |
| 2007/0039985 A1 * | 2/2007 | Warren | ..................... | B60R 9/04 224/321 |

(Continued)

FOREIGN PATENT DOCUMENTS

| | | |
|---|---|---|
| AU | 2002300174 B2 | 6/2003 |
| WO | 97/49574 A1 | 12/1997 |
| WO | 2010/024754 A1 | 3/2010 |

*Primary Examiner* — Peter N Helvey
(74) *Attorney, Agent, or Firm* — Carter, DeLuca & Farrell LLP; George Likourezos

(57) ABSTRACT

Some embodiments are directed to roof racks made substantially of cardboard or plastic, systems for carrying cargo onto a car's roof comprising such roof racks, kits for constructing such roof-rack systems and methods of installing such roof-racks onto a roof of a car.

16 Claims, 8 Drawing Sheets

(56) References Cited

U.S. PATENT DOCUMENTS

2010/0230452 A1* 9/2010 Gerhardt ............... B60R 9/052
                                                          224/321

* cited by examiner

CARDBOARD ROOF RACK SYSTEM

CROSS REFERENCE TO RELATED APPLICATION

This application is a Continuation-in-Part Application and claims priority to International Application No.: PCT/IL2015/050776, filed on Jul. 28, 2015, which claims priority to Israel Patent Application No.: 233856 filed on Jul. 29, 2014, the contents of each of which are hereby incorporated in their entireties by reference.

TECHNOLOGICAL FIELD

The present invention concerns roof racks, e.g. made substantially of plastic or cardboard.

BACKGROUND ART

References considered to be relevant as background to the presently disclosed subject matter are listed below:
WO 10/024754
WO 97/49574
US 2010/0230452
U.S. Pat. No. 8,534,516
AU 2002300174

Acknowledgement of the above references herein is not to be inferred as meaning that these are in any way relevant to the patentability of the presently disclosed subject matter.

BACKGROUND

Roof racks are typically mounted onto the roof of a car and are used for carrying over-sized cargo during transportation. Often, these roof racks need to be fixedly installed onto the car's roof and the type and geometry of the carrier is typically unique to each car model or manufacturer.

As such custom installation is often costly and complex, car owners do not typically install such carriers, and often find themselves in situations which require the use of such carriers. Several portable roof rack systems are known, most of which are such that are structured from rigid foams (see, for example WO 10/024754, U.S. Pat. No. 8,534,516 and AU 2002300174) or metal-made foldable systems (for example of the type described in US 2010/0230452). Such systems, however, are often voluminous and therefore problematic for storage in a car-trunk when not in use. Other known systems comprise flexible structures that need to be inflated prior to use (such as those described, for example, in WO 97/49574), often requiring the use of compressed air.

Therefore, there is a need for a versatile carrier, which will be suitable for installation on the roof of different car models that is easily constructed, installed onto and detached from the car' roof by the user when needed, and conveniently stored when not in use.

GENERAL DESCRIPTION

The present disclosure provides a disposable and/or recyclable roof-rack system, comprising weight-supporting structures which are made substantially of cardboard or plastic. The weight-supporting structures are formed out of cardboard or plastic sheets, typically by folding each of the elements of the structure from a single, pre-shaped, sheet of cardboard or plastic, followed by simple assembly of the elements to form the weight-supporting structure. The present disclosure thus provides a roof rack that is quickly and simply assembled by the user, does not require any custom installation, and may be conveniently removed from the car's roof and disposed-of or recycled after usage.

Thus, in one of its aspects, this disclosure provides a weight-supporting structure, that comprises (i) a crossbar that defines a longitudinal axis, and (ii) at least one first and one second generally prismatic support elements. As noted, each of the crossbar and the prismatic support elements may be made substantially out of cardboard or plastic.

In some embodiments, the crossbar is made of cardboard and the prismatic support elements may be made of plastic. In other embodiments, the crossbar is made of plastic and the prismatic support elements may be made of cardboard. In some other embodiments, the crossbar and the prismatic support elements may be made of cardboard or plastic.

Each of the first and second prismatic support elements has (i) a planar internal member that defines a vertical plane, the plane separating the support element into substantially mirror-image longitudinal units, said internal member being vertically oriented and normal to said longitudinal axis, and (ii) an opening.

The crossbar comprises at least two longitudinal beam elements, each of which having a top edge. The top edges of the beams are adjacent one another, and the beams are arranged so as to define a longitudinal prismatic gap between them. The crossbar is slidably received in the openings of the first and second prismatic support elements, to thereby form the weight-supporting structure.

Without wishing to be bound by theory, the weight-supporting structure is designed to bear and distribute compression loads applied from the top side of the structure. Therefore, when loading a top surface of the prismatic support elements, part of the load is borne (i.e. supported) by the planar internal member, while another part of the load is distributed via the prismatic structure and channeled to the crossbar. The shape of the crossbar allows distribution of the load transferred from the support elements, i.e. from the top edge of the crossbar to bottom edges of the beam members.

In some embodiments, each of the support elements has a generally rectangular cross-section or a trapezoid cross-section, typically an inverted-trapezoid cross section. Each of the first and second support elements has a top surface and a bottom surface, which, in some embodiments, are dimensioned so that the top surface has an area larger than the area of the bottom surface.

According to some embodiments, each of the mirror-image longitudinal units has a prismatic cross-section. Within the context of the present disclosure, the term prismatic denotes a closed shape formed of 3 or 4 sides perpendicular to an imaginary 3- or 4-sided polygonal base, such that a cross-section parallel to the imaginary base is of triangular, rectangular or trapezoid form.

In some embodiments, each of the mirror-image longitudinal units has a right-angle (about 90°) trapezoid cross-section. Typically, the mirror-image longitudinal units are adjacent one another, thereby forming the planar internal member.

According to some embodiments, each of said prismatic support elements is formed out of a single sheet of cardboard or plastic.

According to some other embodiments, each of the support elements may be formed by folding a single sheet of cardboard or plastic.

The term cardboard is meant to encompass a paper product that comprises (i) at least one low-density layer made of paper, heavy duty paper or cardboard (for ease of reference the term paper, will be used hereinafter to refer collectively to paper, heavy duty paper or cardboard) arranged to define a plurality of cells or voids, e.g., formed by corrugated, fluted or otherwise loosely packed paper sheets or strips that define a plurality of voids there between, and comprising (ii) one or more liner cardboard sheets lined at one side or both sides of the low-density layers (namely sandwiching the low-density layer between them). Examples of such cardboard panels are such known as corrugated (or fluted) cardboard, which consists of a fluted or corrugated paper panel(s) or strip and one or two flat linerboards at one or both (i.e. sandwiching) sides of the fluted or corrugated paper; and may also be such referred to as honeycomb cardboard. Such materials are widely used in the manufacture of boxes and shipping containers. The corrugated or honeycomb cardboard panels may be single-walled or multi-walled cardboard panel. These terms are also meant to encompass heavy-duty cardboard of various strengths, ranging from a simple arrangement of a single thick panel of paper to complex configurations featuring multiple corrugated, honeycomb and other layers, or fiber-reinforced cardboard.

The term plastic is meant to encompass a polymeric-based product. A plastic sheet used for construction of the weight-support structure may be a solid plastic sheet (i.e. a sheet having a uniform density along its entire cross-section), or a corrugated, fluted or honeycombed plastic sheet (i.e. a sheet in which a plurality of directional voids are defined), as well as fiber-reinforced plastic.

It is also contemplated that where the weight-supporting structure is made of cardboard, different types of cardboard may be utilized to form the various elements of the structure. Namely, the crossbar may be formed from one type of cardboard, e.g. corrugated cardboard, while the support elements may be made of another type of cardboard, e.g. heavy duty cardboard. Similarly, where the weight-supporting structure is made of plastic, different types of plastic sheets may be utilized to form the various elements of the structure.

The term sheet, whether referring to a cardboard or a plastic sheet, means a planar or substantially planar piece of material with a broad surface that is substantially thin as compared to its length and width. The sheet may be a uniform piece but may also, for example, be made of two or more planar pieces glued or otherwise adhered together to form a larger and/or thicker sheet that is formed into the structure's different components.

The various elements of the structure may be formed out of a cardboard or plastic sheet having a uniform thickness; however it is also possible that the crossbar will be formed from a sheet having a first thickness, while the support elements will be formed out of a sheet having a second, different thickness.

The term formed (or any of its linguistic variations) means to denote the act of giving form or shape to the cardboard or plastic sheet, namely forming the sheet into a final element in the structure. Such forming comprises, for example, folding the sheets into the shape of the elements.

The first and second beam elements may, by some embodiments, be integral with each other.

The term integral means that the sheet portions that are used in the formation of the crossbar are all portions of a single, formed sheet. Thus, by some embodiments, the crossbar is formed out of a single sheet of material, such that the two beam elements are integral one with the other. Typically, the crossbar is formed by folding a single sheet of cardboard or plastic.

In order to provide versatility in installation, the each of said first and second prismatic support elements may, by some embodiments, be slidably displaceable along the crossbar's longitudinal axis. This allows a user to adjust the distance between the prismatic support elements according to the dimensions and curvature of the car's roof.

In a structure of this disclosure, the crossbar may comprise cardboard or plastic having longitudinal hollow channels or longitudinal hollow flutes (e.g. corrugated cardboard or corrugated plastic). By some embodiments, the longitudinal hollow channels or longitudinal hollow flutes are parallel to the longitudinal axis of the crossbar.

The weight-supporting structure may further comprise at least one coating layer, which may be, for example, a liquid impermeable coating layer, a water-repelling coating layer, a paint layer, and others. The outer surface of the structure may be printed with different labels, barcodes, textures, etc.

In some embodiments, the weight-supporting structure may further comprise means for increasing the friction between the support (i.e. prismatic) elements and the rood of the car once the roof-rack is mounted onto car's roof, as explained further below.

According to some embodiments, the weight-support structure of this disclosure is capable of supporting a weight of at least 20 Kg/44 lbs, at least 50 Kg/110 lbs., or even at least 75 Kg/165 lbs.

In another aspect, there is provided a system for carrying cargo on a car's roof, the system comprises a weight-supporting structure as described herein, and attachment means for attaching the weight-supporting structure to the car's roof. In some embodiments, the system may comprise at least two weight-supporting structures and a corresponding number of attachment means (e.g. at least two such means).

In some embodiments, the attachment means permits detachable fitting of the weight-support structure to the roof of the car, i.e. the attachment means does not require custom installation onto the car's roof. Non-limiting examples of such attachment means are a ratchet belt, a lashing belt, a lashing strap, a strap with fasteners (or buckles), a lashing strap fitted with hooks, etc.

The attachment means is, by some embodiments, fitted through the longitudinal prismatic gap defined between the beam elements of the crossbar. In other embodiments, the attachment means is associated with (i.e. adhered, glued) to a one of the surfaces defining said longitudinal prismatic gap.

In order to fasten the cargo onto the weight-supporting structures, the system may, by some embodiments, further comprise additional strapping means. The additional strapping means are typically, but not exclusively, fitted through the longitudinal prismatic gap defined between the beam elements.

In another aspect, the present disclosure provides a kit for constructing a roof-rack system to be attached onto a roof of a car, the kit comprising at least one first sheet having a first set of fold lines, the first sheet being shaped for folding into a crossbar, such that when folded, the crossbar defines a longitudinal axis, and comprises at least two longitudinal beam elements, each of which having a top edge, the top edges of the beams being adjacent one another, the beams being arranged so as to define a longitudinal prismatic gap between them; at least two second sheets having a second set of fold lines and a set of cut-outs, each being shaped for folding into a prismatic support element, such that when folded, (i) the prismatic support element having a planar internal member defining a vertical plane separating the support elements into substantially mirror-image longitudinal elements, said internal member being vertically oriented and normal to said longitudinal axis, and (ii) the cut-outs are aligned to form an opening in each of the prismatic support elements for slidably receiving said crossbar; and optionally comprises attachment means. The first and second sheets being made of cardboard or plastic.

The folding lines in the sheets may, by some embodiments, be constituted by perforations patterned in line forms, line areas of a reduced thickness, line areas formed out of non-reinforced cardboard or plastic, pre-stressed line areas, etc.

The kit may further comprise instructions for use, which may typically, though not exclusively, be printed onto the surface of the sheets.

In other embodiments, the kit may further comprise means for increasing the friction between the support elements and the rood of the car once the weight-support structure is mounted onto car's roof. Such means may include, for example, stickers having an external surface designed for increasing the friction between the support elements and the car's roof, which may be applied to the bottom surface of the support elements that comes into contact with the car's roof. In another example, the friction-increasing means are an integral part of the second sheets, from which the support elements are folded, and positioned such that once folded into its final shape, the friction-increasing means will be integral with the surface of the support elements that is designed to come into contact with the car's roof.

In some embodiments, the weight-supporting structure is disposable. In other embodiments, the weight-supporting structure is recyclable. In further embodiments, the weight-supporting structure may be unfolded after use for ease of storage.

According to another aspect, there is provided a method of installing a roof-rack onto a roof of a car, the method comprising:
  providing a weight-supporting structure as herein described;
  providing an attachment means for attaching the weight-supporting structure to the car's roof;
  fitting the attachment means through the longitudinal prismatic gap formed in the weight-supporting structure;
  positioning the weight-supporting structure onto the car's roof; and
  fastening the attachment means to the car's roof.

A further aspect provides a method of installing a roof-rack onto a roof of a car, the method comprising:
  providing a kit as herein described;
  folding said first sheet along the first set of fold lines to form said crossbar;
  folding each of said second sheets along the second set of fold lines to form said prismatic support elements;
  sliding the crossbar into the openings formed in the prismatic support elements to form said weight-supporting structure;
  fitting an attachment means through the longitudinal prismatic gap formed in the weight-supporting structure;
  positioning the weight-supporting structure onto the car's roof; and
  fastening the attachment means onto the car's roof.

BRIEF DESCRIPTION OF THE DRAWINGS

In order to better understand the subject matter that is disclosed herein and to exemplify how it may be carried out in practice, embodiments will now be described, by way of non-limiting example only, with reference to the accompanying drawings, in which.

DETAILED DESCRIPTION OF EMBODIMENTS

Figure 1:
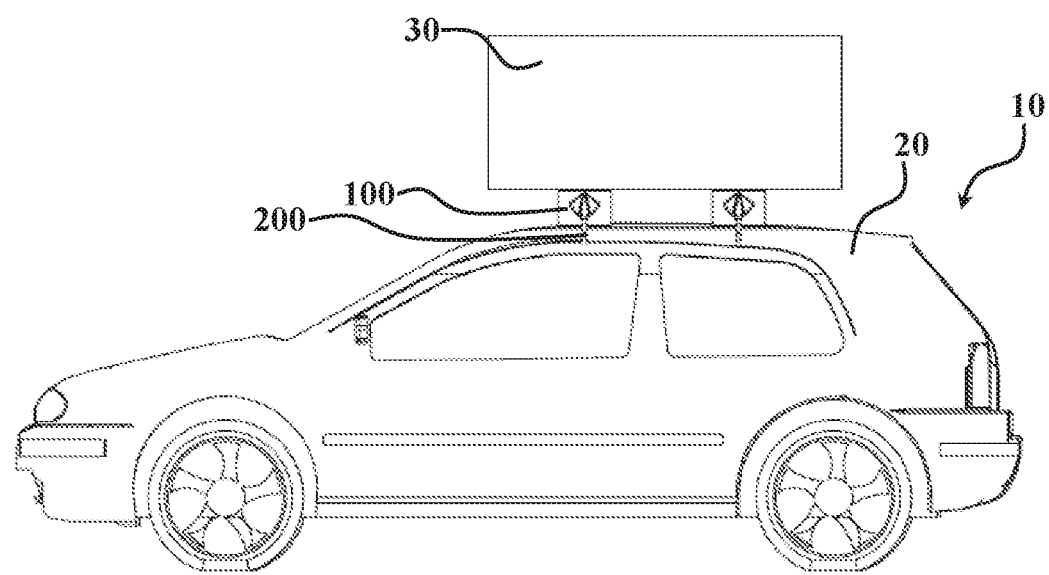
FIG. 1 shows a system according to an embodiment of this disclosure, installed onto a car's roof.

Turning to FIG. 1, two weight-supporting structures 100 are shown, installed onto a roof 10 of a car 20. As will be further explained below, the weight-supporting structures 100 are positioned on the car's roof and held in place by attachment means 200, which are fitted through the weight-supporting structures. Although only two weight-supporting structures are shown in FIG. 1, it is contemplated that more than two structures may be used, typically depending on the weight of the cargo 30 to be carried and supported, as well as the dimensions of the car's roof.

As noted above, the weight-supporting structures may be made of cardboard, plastic or a combination thereof. An example may be corrugated cardboard or corrugated plastic.

Figure 2A:
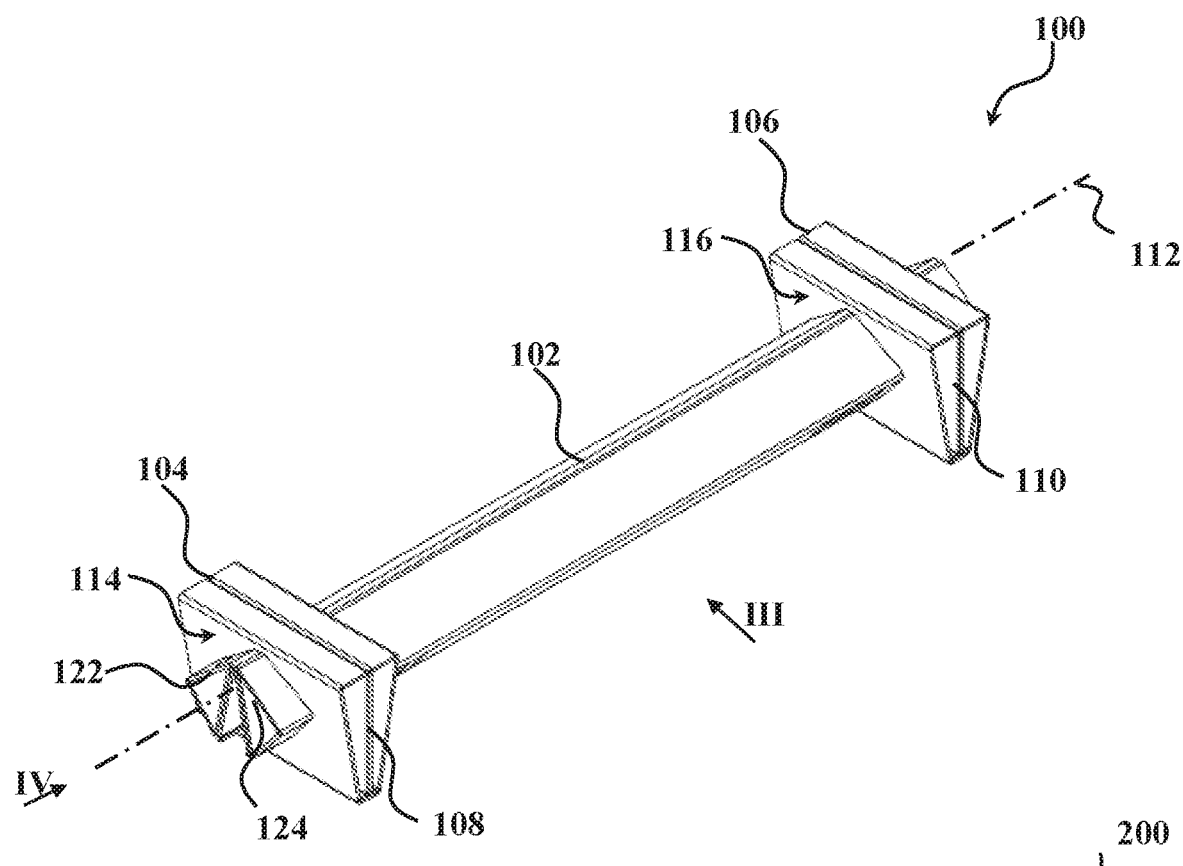
FIG. 2A is an isometric view of a weight-supporting structure according to an embodiment of this disclosure.

FIG. 2A shows in detail the weight-supporting structure 100. The weight-supporting structure comprises a crossbar 102 and two prismatic support elements, 104 and 106. As noted above, the crossbar and the prismatic support elements are made substantially out of cardboard or plastic, and are each typically formed, as will be explained further below, out of a single folded sheet of material (i.e. cardboard or plastic).

Figure 3:
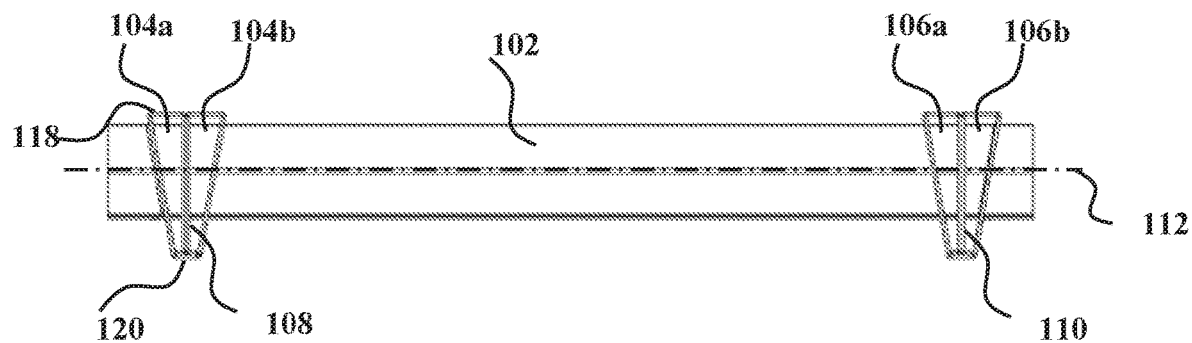
FIG. 3 is a side view of the structure of FIG. 2A from the direction noted by arrow III.

Each of the support elements 104 and 106, includes a planar internal member 108 and 110, respectively, as can also be seen in FIG. 3 (showing the view from the direction of arrow III). Each of the planar internal members 108 and 110 defines a vertical plane separating each of the support elements 104 and 106 into substantially mirror-image longitudinal units 104a, 104b and 106a, 106b respectively. The planar internal members 108, 110 function to support a part of the mechanical load exerted by the cargo to be supported, while another part of the load is transferred to the crossbar, as will be explained below. As can be better seen in FIG. 3, the internal members 108 and 110 are substantially parallel to one another, and are both normal to a longitudinal axis 112 defined by the crossbar 102. Openings 114 and 116 are formed in each of the support elements 104 and 106, respectively, and are dimensioned to be slightly larger than the cross section dimensions of the crossbar, such that the crossbar may be slidably fitted through the openings, to form the weight-supporting structure.

It is of note that the slight difference is dimensions between the cross-section of the crossbar and the dimensions of the openings 114, 116 allows for a snug fit of the crossbar into the support elements while maintaining a degree of freedom to change the distance between the support elements to afford versatility and adaptability to different roof dimensions and configurations.

By some embodiments, shown in FIGS. 2A and 3, each of the support elements has an inverted trapezoid shape, having a generally planar upper surface 118 and a generally planar bottom surface 120. The upper and bottom surfaces 118, 120 are parallel one to the other. The surface area of upper surface 118 is larger than the area of the bottom surface 118, to allow support of the mechanical load applied by the cargo baggage weight, and its efficient transfer to the car's roof and the crossbar. It will be appreciated by a person of skill that the support elements may also have different cross-sectional shapes, such as rectangular or trapezoid.

Figure 4:
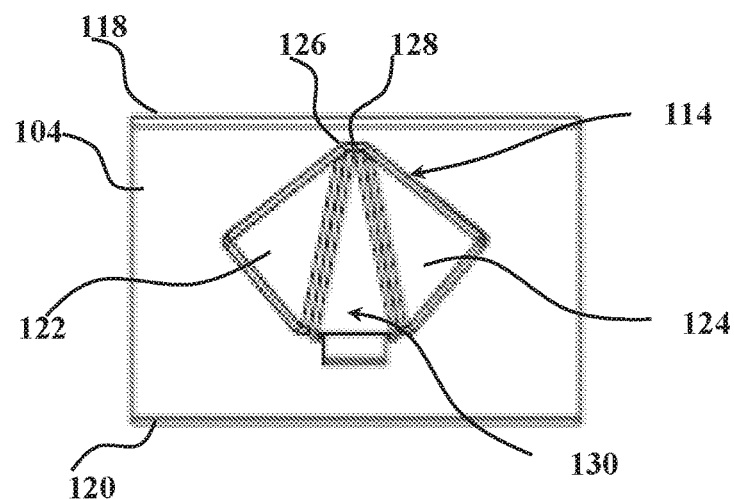
FIG. 4 is a side view of the structure of FIG. 2A from the direction noted by arrow IV.

As can also be seen in FIG. 4 (which is a view of the weight-supporting structure from the direction of arrow IV), crossbar 102 comprises two longitudinal beam elements 122, 124, each of which having a top edge 126 and 128, respectively. The top edges 126 and 128 of the beams are adjacent one another, and the beams are arranged, i.e. angled one versus the other, so as to define a longitudinal prismatic gap 130 between them. Each of the beam elements 122, 124 typically have a generally triangular cross-section. The arrangement of the beams one with respect to the other allows for efficient load distribution exerted from the direction of the top edges, once the weight-supporting structure is loaded with luggage/baggage/cargo to be carried.

Figure 2B:
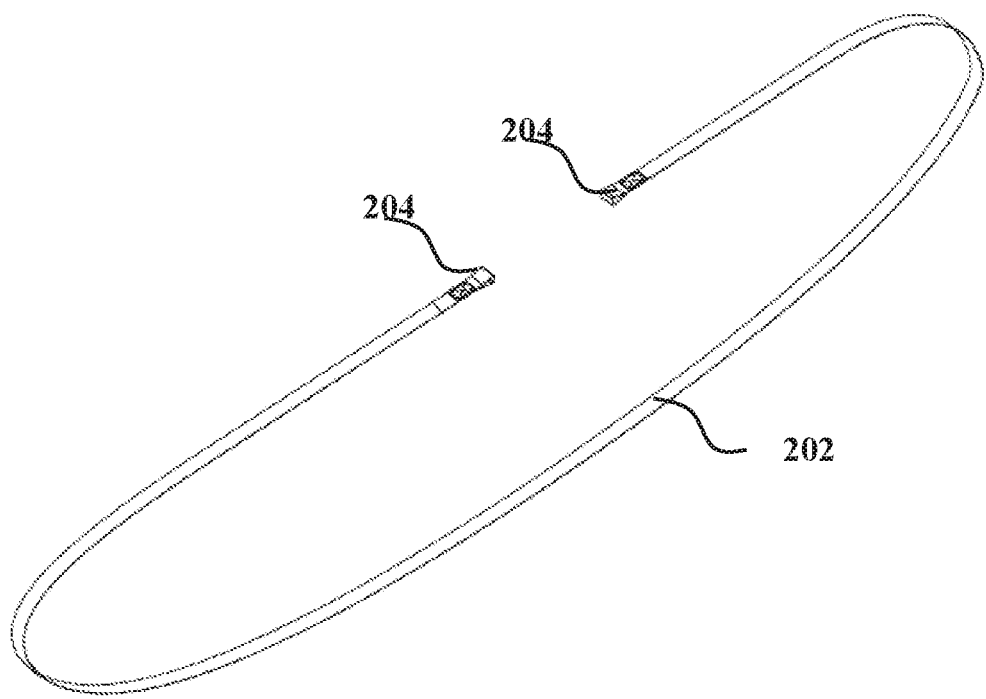
FIG. 2B shows an attachment means for attaching the weight-supporting structure of FIG. 2A to the car's roof.
Figure 8A:
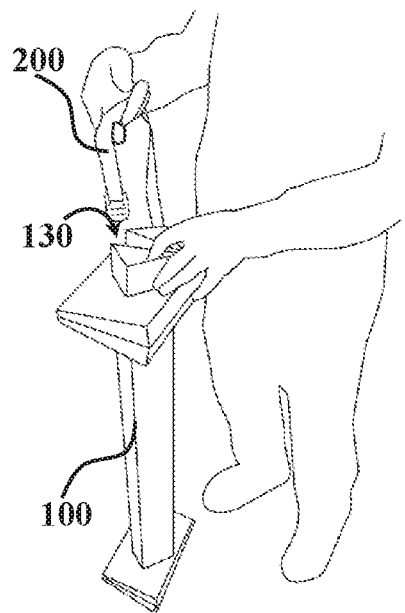
FIGS. 8A-8C show the mounting sequence of a structure of FIG. 2A onto a car's roof.
Figure 8B:
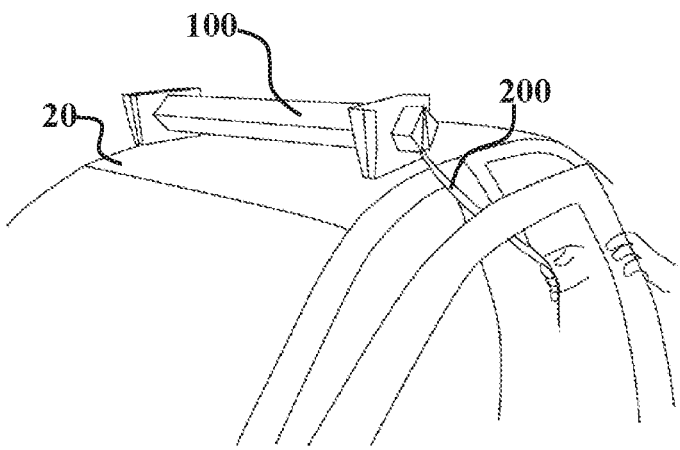
Figure 8C:
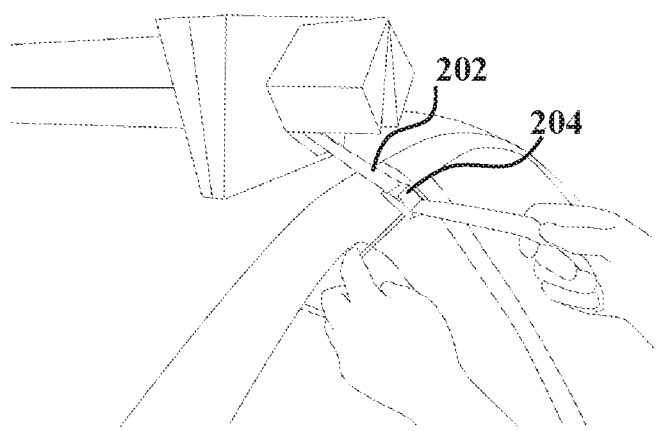

In order to affix the weight-supporting structure onto a roof of a car, attachment means are used, such as that shown in FIG. 2B. The exemplary attachment means 200 shown in FIG. 2B includes a strap 202 and fastening means 204 at one or both edges of the strap. For attaching the weight-support structure onto the car's roof, a user slides the strap 202 through the longitudinal prismatic gap 130 formed in the weight-support structure, leaving both ends of the strap to hang out of the ends of gap 130. After positioning the weight-support structure in the desired position, i.e. across the width dimension of the car's roof (as can also be seen in detail in FIGS. 8A-8C), the edges of the strap are passed through the car's open windows, then the fastening means 204 are connected in order to apply tension onto the strap. In some embodiments, the attachment means is in the form of a ratchet belt, allowing adjustment of the tension applied onto the strap.

The weight-support structure may be stored in a flat-pack prior to use. When required, the weight-support structure can be assembled by simply folding each of the structure's elements into shape, followed by assembling the weight-support structure. FIGS. 5A-5E, 6A-6D and 7 show the sequence of folding and assembling of the crossbar, the support elements and the weight-support structure, respectively.

Figure 5A:
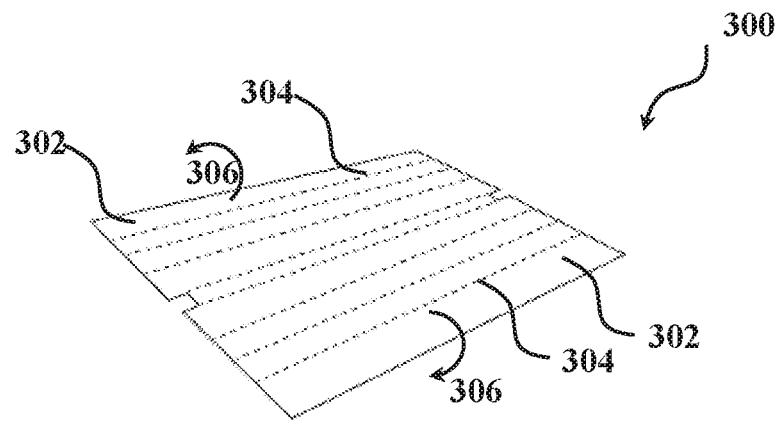
FIGS. 5A-7 show the folding sequence for constructing the structure of FIG. 2A according to an embodiment of this disclosure.
Figure 5B:
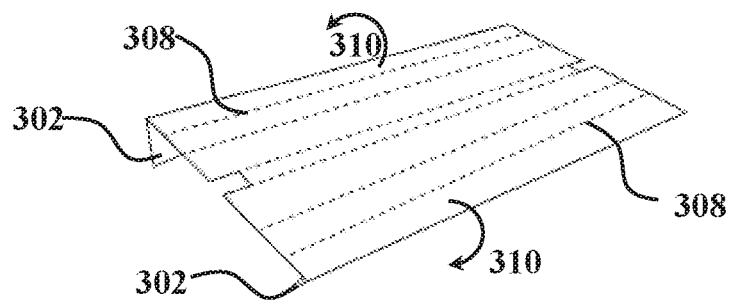
Figure 5C:
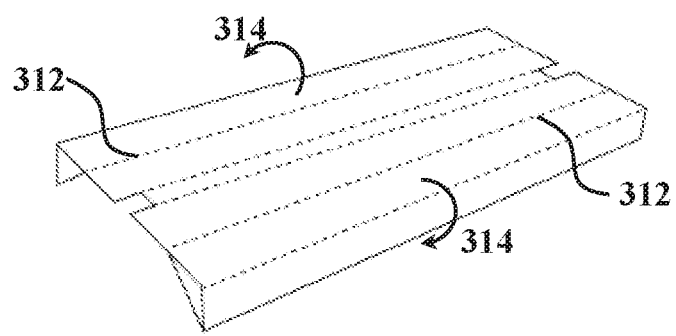
Figure 5D:
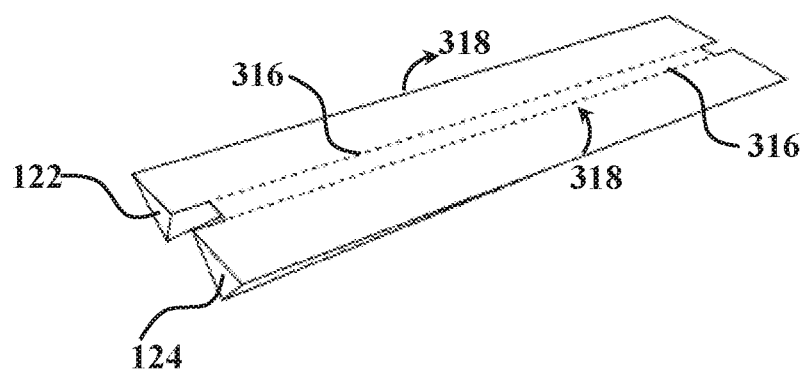
Figure 5E:
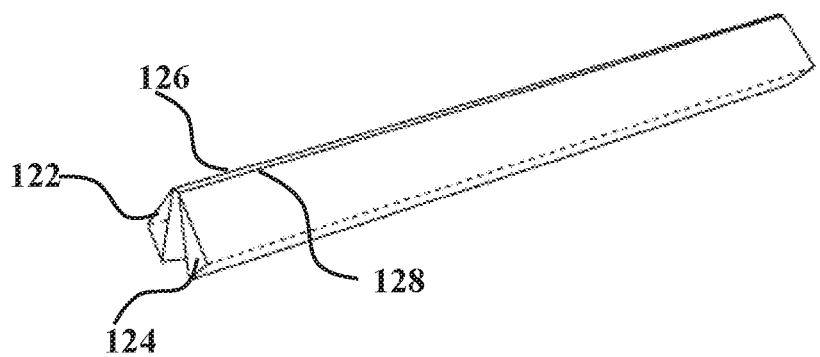

As can be seen in FIGS. 5A-5C, the crossbar may be formed from a single sheet of cardboard or plastic 300, onto which a set of fold-lines is formed. The user first folds sections 302 about fold-line 304, as shown by arrows 306 (FIG. 5A). Another fold is then made along fold-lines 308 in the direction of arrows 310 (FIG. 5B), followed by another fold along fold-lines 312 in the direction of arrows 314 (FIG. 5C). These folding actions result in the formation of the two beam elements 122, 124, which are then folded about fold-lines 316 in the direction of arrows 318 (FIG. 5D), to bring edges 126 and 128 of the beams adjacent one, thereby forming the crossbar (FIG. 5E).

Figure 6A:
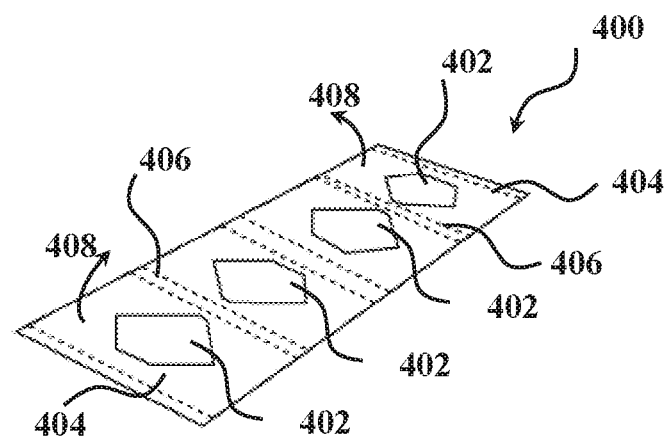
Figure 6B:
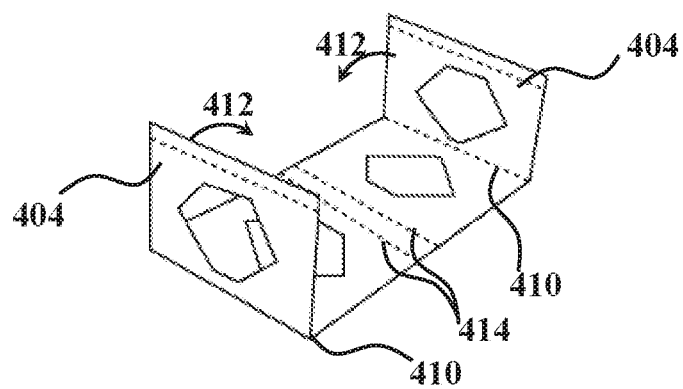
Figure 6C:
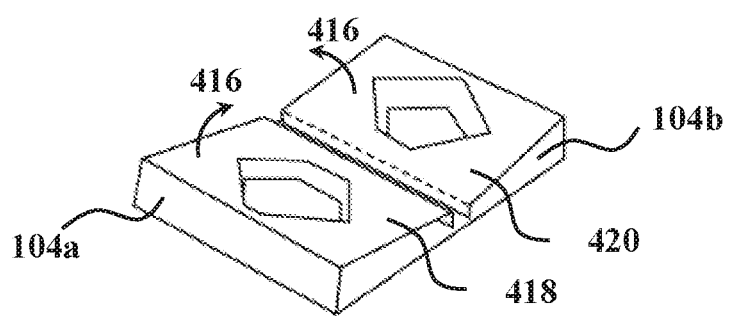
Figure 6D:
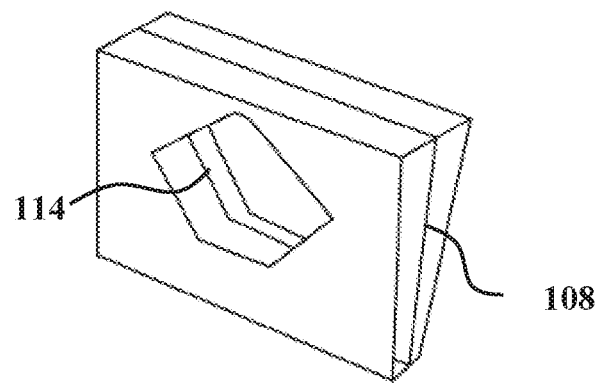

Each of the prismatic support elements is formed out of a single sheet of cardboard or plastic, as can be seen in FIGS. 6A-6D. The following description will relate to the formation of prismatic support element 104, however it is to be understood that the formation of prismatic support element 106 is carried out similarly. Sheet 400 is pre-formed with cut-outs 402. The cut-outs are designed to match the shape of the crossbar's cross-section, and are dimensioned to be slightly larger than the crossbar's cross-section, in order to allow the crossbar to be slidably fitted into openings. The cut-outs the may be such that are hollow, or may be pre-punched into the sheet such that a user needs to take out the complementary shape in order to expose the cut-out (FIG. 6A). Sheet sections 404 are folded along fold-lines 406 in the direction of arrows 408 (FIG. 6B), and then along fold-lines 410 in the direction of arrows 412. This results in the mirror-image longitudinal units 104a and 104b. The mirror-image units are then folded along fold lines 414 in the direction of arrows 416 (FIG. 6C), to bring faces 418 and 420 into close proximity, thereby forming the planar internal member 108 (FIG. 6D). It is of note that the cut-outs 402 are positioned such that, once folded into the final support element shape, the cut-outs are aligned to define opening 114.

Figure 7:
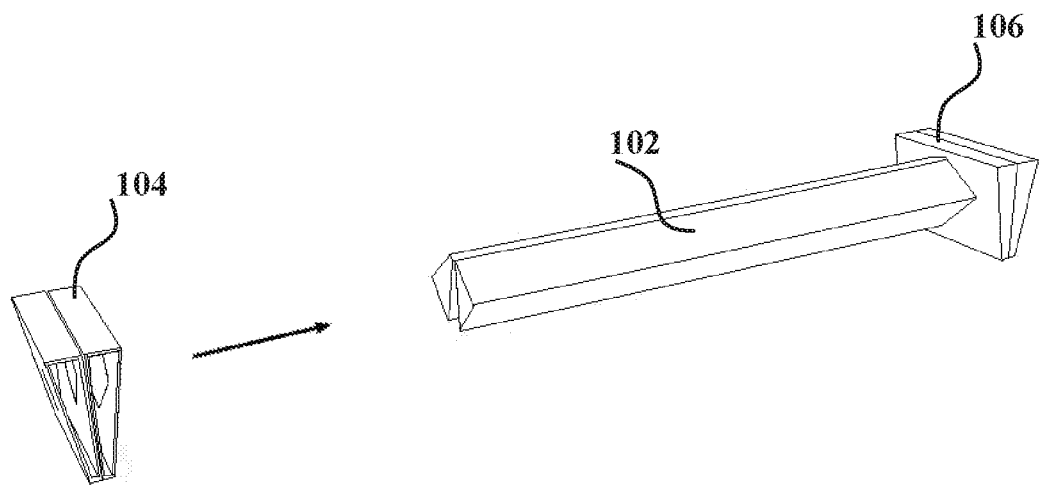

Once all elements are formed, the crossbar 102 is fitted into the openings 114 and 116, and the distance between support elements 104 and 106 can be adjusted as required, as seen in FIG. 7.

The invention claimed is:

1. A weight-supporting structure, comprising:
   a crossbar defining a longitudinal axis and at least one first and one second generally prismatic support elements, the first and second support elements each including:
   (i) a planar internal member defining a vertical plane separating the support elements into substantially mirror-image longitudinal units, the internal member being vertically oriented and normal to the longitudinal axis, and
   (ii), an opening;
   the crossbar including at least two longitudinal beam elements, each of which including a top edge, the top edges of the beams being adjacent one another, the beams being arranged so as to define a longitudinal prismatic gap between them;
   the crossbar being slidably received in the openings to thereby form the weight-supporting structure, and
   the foldable weight-supporting structure being made of cardboard, plastic or a combination thereof.

2. The structure of claim 1, wherein the crossbar and support elements are made substantially out of cardboard.

3. The structure of claim 1, wherein the crossbar and support elements are made substantially out of plastic.

4. The structure of claim 3, wherein the crossbar and support elements are made substantially out of corrugated plastic.

5. The structure of claim 1, wherein the support elements have a generally rectangular cross-section or a trapezoid cross-section.

6. The structure of claim 5, wherein the support element has an inverted-trapezoid cross section.

7. The structure of claim 6, wherein each of the first and second support elements has a top surface and a bottom surface, the top surface having an area that is larger than the area of the bottom surface.

8. The structure of claim 1, wherein each of the mirror-image longitudinal units has a prismatic cross-section.

9. The structure of claim 8, wherein each of the mirror-image longitudinal units has a right-angle trapezoid cross-section.

10. The structure of claim 1, wherein the mirror-image longitudinal units are adjacent one another to form said planar internal member.

11. The structure of claim 1, wherein each of said first and second prismatic support elements is slidably displaceable along said longitudinal axis.

12. A system for carrying cargo onto a roof of a car, the system comprising:
   at least two weight-supporting structures of claim 1, and
   at least two attachment means for attaching the weight-supporting structure to the car's roof.

13. The system of claim 12, wherein said attachment means is detachably fitted to the car-roof, optionally wherein said attachment means is selected from a ratchet belt, a lashing strap, and a lashing belt.

14. The system of claim 12, wherein said attachment means is fitted through the longitudinal prismatic gap defined between the beam elements.

15. The system of claim 1, further comprising additional strapping means for strapping a cargo to be carried by the weight-supporting structures, said additional strapping means being fitted in longitudinal prismatic gap defined between the beam elements.

16. A kit for constructing a roof-rack system to be attached onto a car's roof, the kit comprising:
   at least one first sheet having a first set of fold lines, the first sheet being shaped for folding into a crossbar, such that when folded, the crossbar defines a longitudinal axis and comprises at least two longitudinal beam elements, each of which having a top edge, the top edges of the beams being adjacent one another, the beams being arranged so as to define a longitudinal prismatic gap between them;
   at least two second sheets having a second set of fold lines and a set of cut-outs, each being shaped for folding into a prismatic support element, such that when folded, (i) the prismatic support element having a planar internal member defining a vertical plane separating the support elements into substantially mirror-image longitudinal elements, said internal member being vertically oriented and normal to said longitudinal axis, and (ii) the cut-outs are aligned to form an opening in each of the prismatic support elements for slidably receiving said crossbar; and
   optionally comprising attachment means and/or friction increasing means,
   the first and second sheets being made of cardboard or plastic.

* * * * *